United States Patent [19]
Withers

[11] 3,821,051
[45] June 28, 1974

[54] PROCESS FOR BONDING RIB STRUCTURES OF THERMOPLASTIC RESIN

[75] Inventor: Michael Somerville Withers, Landenberg, Pa.

[73] Assignee: E. I. du Pont de Nemours and Company, Wilmington, Del.

[22] Filed: Dec. 16, 1970

[21] Appl. No.: 98,852

Related U.S. Application Data

[63] Continuation-in-part of Ser. No. 831,145, June 6, 1969, abandoned.

[52] U.S. Cl............ 156/203, 156/218, 156/289, 156/304, 156/306, 156/322, 161/69, 161/123, 161/139
[51] Int. Cl..... B29d 23/10, B32b 3/12, B32b 31/04
[58] Field of Search........... 156/203, 218, 289, 304, 156/306, 322, 499; 161/69, 123, 139

[56] References Cited
UNITED STATES PATENTS

| | | | |
|---|---|---|---|
| 3,119,216 | 1/1964 | Held | 53/39 |
| 3,141,913 | 7/1964 | Edwards | 264/210 R |
| 3,282,766 | 11/1966 | Wright | 156/499 |
| 3,391,045 | 7/1968 | Mojonnier et al. | 156/304 |
| 3,509,005 | 4/1970 | Hartig | 161/69 |
| 3,616,130 | 10/1971 | Rogosch et al. | 161/57 |
| 3,664,906 | 5/1972 | Hartig | 161/68 |
| 3,748,214 | 7/1973 | Withers | 161/122 |

*Primary Examiner*—Charles E. Van Horn
*Assistant Examiner*—Robert A. Dawson

[57] ABSTRACT

Ribbed structure laminate is provided comprising a film of thermoplastic resin heat-bonded to the tops of a plurality of ribs which are in turn integrally molded at their base with another film of thermoplastic resin, with the junction between the first-mentioned film and the tops of the ribs being in the form of a smooth transition between the film and a flange formed along the top of each rib. The laminate is useful as a material of construction such as for packaging, heat exchangers and insulation. The laminate can be made by maintaining the ribs in contact with a heated release surface so as to form a molten flange along the top of each rib, progressively removing the molten flanges from the release surface, and progressively contacting the molten flanges with a film of heated thermoplastic resin. This process is also applicable to the bonding of other thermoplastic resin objects, surface-to-edge or edge-to-edge, together.

5 Claims, 15 Drawing Figures

PROCESS FOR BONDING RIB STRUCTURES OF THERMOPLASTIC RESIN

This application is a continuation-in-part of copending U.S. Pat. application Ser. No. 831,145, filed June 6, 1969 by the same inventor and now abandoned.

This invention relates to improved ribbed structure laminates of thermoplastic resin and to processes for making these improved structures as well as for bonding thermoplastic resin objects one to the other.

Figure 1:
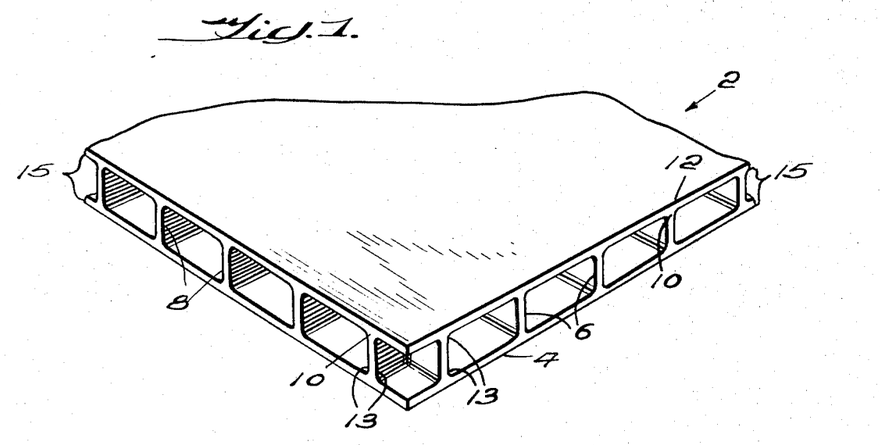
FIG. 1 shows in perspective and in enlargement a portion of a sheet of ribbed structure laminate of the present invention.
Figure 2:
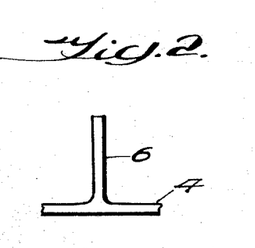
FIG. 2 shows in side elevation and in further enlargement a single rib just prior to lamination to a film according to prior art procedure.

Ribbed structures and a method for making them are disclosed in U.S. Patent Application Ser. No. 619,995, now U.S. Pat. No. 3,509,005, filed Mar. 2, 1967 by Hartig (French Pat. No. 1,524,796), the basic elements of the ribbed structures comprising a plurality of ribs extending from a surface of and integrally molded with a film of thermoplastic resin, with the bulk density of the ribbed structures being less than 30 percent of the density of the resin. Also disclosed is the lamination of another film of thermoplastic resin to the tops of the ribs by bringing the film and the tops of the ribs together under such heat-softened condition that they heat bond to one another. The means disclosed for obtaining this heat-softened condition is a localized heat source such as a burner positioned between the film and the tops of the ribs and spaced from each immediately preceding the point at which the film and ribs come together. A similar arrangement using an electric heater instead of a burner for laminating a film to the tops of ribs of a ribbed structure is shown in FIGS. 1 and 2 of U.S. Pat. No. 3,141,913 to Edwards.

This laminating technique involves the use of short exposure times of the film and ribs to heating just before lamination and the use of much higher temperatures than the melting temperature of the resin in order to heat the resin sufficiently for the film and ribs to heat-bond together. Invariably, the strength of the junction between the film and the ribs in the resultant laminate is inferior to the strength of the components of the laminate. Thus, when the laminate is subjected to tearing, the tear follows the junction, and when subjected to internal pressure such as in heat-exchange application, the film and ribs delaminate from one another which also occurs when the film is peeled from the ribbed structure.

The inferior strength of the junction can be traced to one or more of the following characteristics of the junction: insufficient heating of the ribs or film, degradation of the resin caused by the high temperatures and nature of the heat source which prevents good heat bonding even with sufficient heating, penetration of the film by the ribs, and the formation of sharp angles between the ribs and the film. The nature of the heat source in heating the film and ribbed structure by convection and radiation for only a brief period does not lend itself to changing these characteristics so as to improve the strength of the junction.

In addition, even though only a small area of the ribbed structure is heated at a time, the convection and radiation heating does not confine itself to the tops of the ribs but instead heats the entire area of the ribbed structure under exposure. This has several disadvantages, the first being that melting of the top of the ribs is accompanied by softening of the film and ribs of the ribbed structure, with the degree of softening depending on the relative thickness of the film and the ribs. When the film of the ribbed structure is of equal or lesser thickness than the thickness of the ribs, the film will melt with or before, respectively, the melting of the tops of the ribs, rendering the ribbed structure dimensionally unstable during laminating. Second, the heating of the entire rib causes the rib to become shorter and thicker due to the elastic memory of the resin making up the ribs. This leads to further dimensional instability in that the degree of shortening varies with the degree of heating, and heating uniformly both lengthwise and transversely across the ribbed structure is not obtainable. Furthermore, when the ribs run both lengthwise and transversely, the transverse ribs get less heat than the lengthwise ribs, which leads, e.g. to penetration of the film by the transverse ribs. When the temperature of heating is increased to better melt the tops of the transverse ribs, the lengthwise ribs become excessively heated and shorten, and thereby fail to laminate to the film.

The prior art laminating technique produces a laminate which also suffers from several appearance defects, namely, the occasional, scattered presence of small, approximately round imperfections on the surface of the film laminated to the tops of the ribs, possibly resulting from the entrapment of air between this outer surface and the surface of the roll used to press the film against the tops of the ribs. Another defect is the presence of concavities in the film, resulting from the partial vacuum conditions existing within the ribbed structure upon cooling after lamination.

THE INVENTION

The present invention provides a laminate of film heat-bonded to a ribbed structure, which has an improved appearance and dimensional uniformity and in which the strength of the junction between the ribs and the film laminated thereto is at least as good as the strength of the components forming the remainder of the laminate, i.e., the first film plus ribs and the second film. More particularly, the improved laminates of the present invention comprise a first film 1 to 10 mils thick and a plurality of ribs 2 to 20 mils thick integrally molded to the surface of the film and forming a smooth transition therewith, with the tops of the ribs being flanged in a direction parallel to the film, the flange extending on both sides of its respective rib, and a second film-heat-bonded to the other surface of the flanges of the ribs and forming a smooth transition between the ribs and the second film, each of the films and the ribs being made of thermoplastic resin. The second film is from 1 to 25 mils thick but will usually be from 1 to 10 mils thick. Usually, the rib thickness will be from 2 to 16 mils thick, and preferably the rib thickness is from 2 to 10 mils.

This improved laminate can be made by advancing the ribbed structure along a path, with the tops of the ribs extending from the first film being in pressure contact with a heated release surface moving in the direction of and at the same speed as the ribbed structure so as to form the tops of the ribs into a molten flange extending on both sides of the ribs, progressively separating the ribbed structure from the heated release surface, and progressively contacting the molten flanges at the top of the ribs with the second film which is in sufficiently heated condition to heat bond to the molten flanges, and thereafter cooling the resultant ribbed structure laminate. The heated release surface provides several benefits, namely heating by conduction which better localizes the heating to the tops of the ribs, lower temperatures and longer heating times, preshaping of the tops of the ribs to improve the geometry of the junction, and better dimensional uniformity regardless of rib pattern.

The present invention will be described more fully hereinafter with reference to the accompanying drawings in which.

With reference to the drawings, the improved ribbed structure laminate of the present invention shown in FIG. 1 and designated by the legend 2 comprises a first film 4, a plurality of ribs 6 extending in one direction and integrally molded to the film 4, a plurality of ribs 8 integrally molded to film 4 and extending in the direction perpendicular to the direction of ribs 6, with the tops of the ribs 6 and 8 being formed into flanges 10 which extend along the length of their respective ribs and on both sides thereof, and a second film 12 heat-bonded to the tops or outer surfaces of the flanges 10. The flanges provide a smooth transition between the ribs 6 and 8 and film 12, in the form of a radius 13 which is generally at least equal to the thickness of the individual ribs. This same radius is present between the ribs and film 4 as molded. The films and the ribs are all made of thermoplastic resin.

Figure 3:
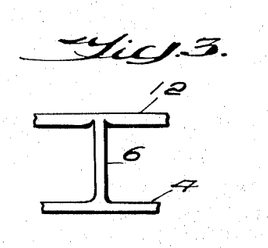
FIG. 3 shows in side elevation the single rib of FIG. 2 laminated by heat-bonding to a film.

The basic components of the laminate 2 are the ribbed structure 15 (FIG. 1) comprising the film 4 and ribs 6 and 8, as one component, and the second film 12 as the other component. These components are manufactured separately and then laminated one to the other. When the lamination step is carried out according to the prior art procedure of using the heat source spaced from the tops of the ribs, the rib typically keeps its original manufactured form as shown by rib 6 in FIG. 2. Upon lamination of the film 12 to this rib, the rib penetrates the film 12 causing either a thinning out of the film 12 at the point of penetration or a sharp angle junction between the rib 6 heat-bonded to the film 12, or both as shown in FIG. 3. The sharp angle and the thinning out of film 12 create lines of weakness or stress risers along the junction of the rib and the film 12 of the laminate.

Figure 4:
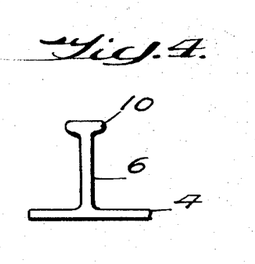
FIG. 4 shows in side elevation and in enlargement the shape of a single rib of the ribbed structure just prior to lamination to a film according to the present invention.
Figure 5:
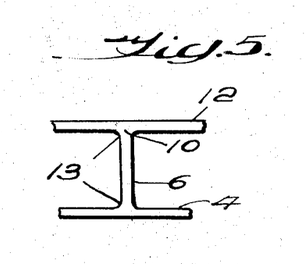
FIG. 5 shows in side elevation the single rib of FIG. 4 laminated by heat-bonding to a film.

In the present invention, prior to lamination, the rib 6 shown in FIG. 2 is converted to the rib form shown in FIG. 4 wherein the rib 6 is topped by a molten flange 10 extending on both sides of the rib and along its top. Then upon lamination of the film 12 to the rib 6 of FIG. 4, the outer surface of the flange 10 forms a large area of contact for heat-bonding to the film 12, and a radius 13 therewith, and does not penetrate the film 12 nor form an acute angle junction with the film 12. Accordingly, the line of weakness present in the prior art procedure resulting in the configuration shown in FIG. 3, is absent in the present invention.

Figure 6:
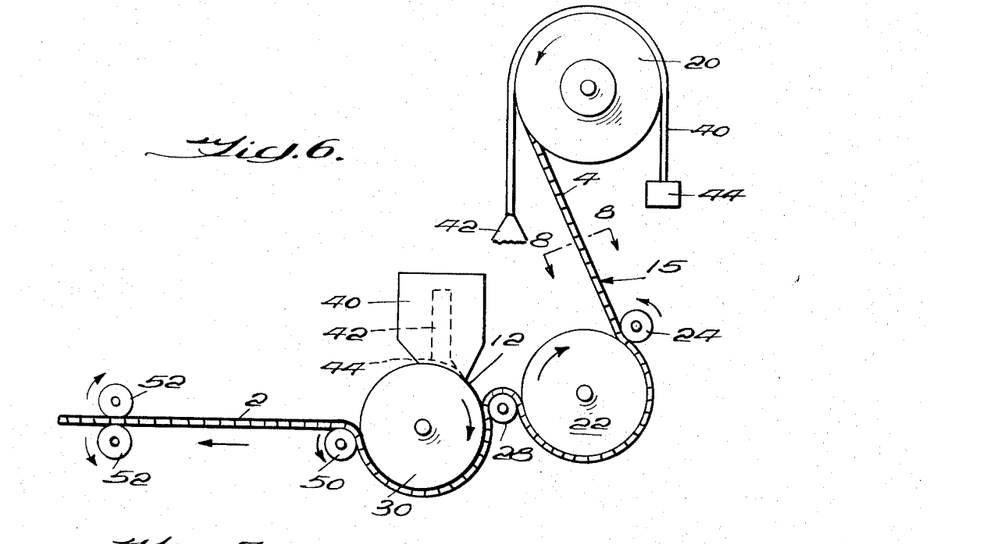
FIG. 6 shows schematically in side elevation, apparatus suitable for making the improved ribbed structure laminate of the present invention.
Figure 7:
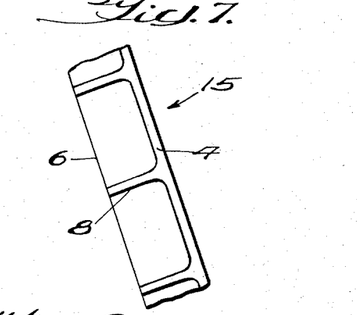
FIG. 7 shows in enlargement a lengthwise portion of ribbed structure being fed into the apparatus of FIG. 6.
Figure 8:
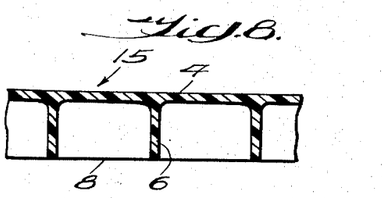
FIG. 8 shows in enlargement a transverse portion of the cross-section of ribbed structure taken along line 8—8 of FIG. 6.

Apparatus and process for converting the rib form shown in FIG. 2 to the rib form shown in FIG. 4 and carrying out the lamination step on a continuous basis is shown in FIG. 6. In FIG. 6, ribbed structure 15 comprising film 4 and ribs 6 and 8 integrally molded thereto is fed from a reel 20 through the nip between a hot roll 22 and a rubber-faced guide roll 24 rotating as indicated. The ribbed structure 15 forming one component of the laminate 2 to be later formed in the process is shown in greater detail in FIGS. 7 (lengthwise portion) and 8 (transverse section). The surface of hot roll 22 is uniformly heated by hot oil flowing through passages (not shown) within the roll to a temperature which is above the melting point of the thermoplastic resin from which the ribbed structure 15 is made. The surface of roll 22 and the ribbed structure 15, rib-side down, move in contact with one another, preferably for at least 180° of rotation of the roll and in the embodiment shown, for about 225° of rotation of the roll 22, during which time the tops of the ribs 6 and 8 are melted.

Figure 9:
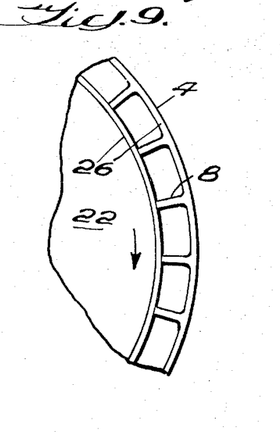
FIG. 9 is a side elevation enlargement of a portion of the hot roll of the apparatus of FIG. 6.
Figure 10:
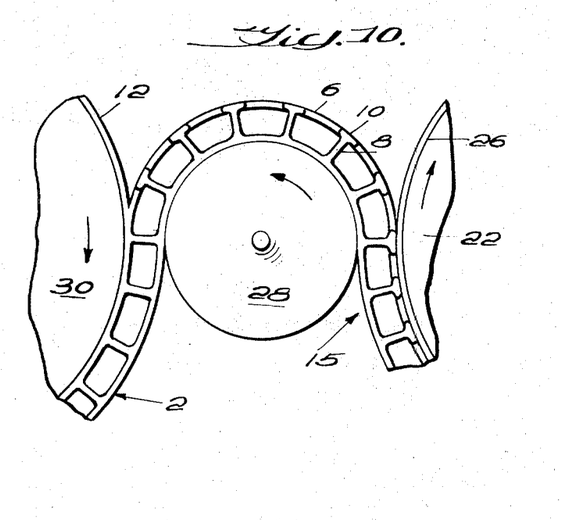
FIG. 10 is a side elevation enlargement of portions of the hot roll, stripping roll, and laminating roll of the apparatus of FIG. 6.

Molten thermoplastic resin is quite sticky and for this reason the surface of roll 22 is covered with a layer 26 of release material (FIG. 9), i.e., a material to which the molten resin does not have any appreciable degree of adherence. By the time the ribbed structure reaches the nip between a transfer roll 28 and the hot roll 22, the tops of the ribs 6 and 8 have become molten and formed into flanges 10 hereinbefore described. The transfer roll 28 rotating in the direction indicated progressively removes the ribbed structure and thereby the molten flanges from the surface of roll 22 and then passes the ribbed structure through the nip between itself and a forming roll 30 which has on its surface a heated film of thermoplastic resin 12 as best shown in FIG. 10 rotating in the direction shown (FIGS. 6 and 10). During transfer of the molten flanges between rolls 22 and 30, the outer surface of the flanges tends to round-off somewhat because of surface tension and the slight sticking of the molten resin to the release surface 26, but this does not interfere with subsequent heat bonding to the film 12.

At the nip between rolls 28 and 30, lamination of the film 12 and the molten flanges 10 occurs to form the improved laminate 2 of the present invention. The overall thickness of the laminate is determined by the spacing at the nip between rolls 28 and 30 and is several mils less than the combined thickness of the film 12 and flanged ribbed structure 15 being fed into the nip.

The film 12 is continuously formed on the surface of roll 30 using the same molding technique used for preparing patterned webs as described in said U.S. application Ser. No. 619,995, except that instead of roll 30 being patterned, it has a smooth surface. In further detail, film 12 is formed from a die 40 containing an internal slot-shaped passage 42 supplied with molten thermoplastic resin from an extruder (not shown) and traversing the surface of roll 30 and also terminating in an outwardly flaring outlet 44. Extrusion pressure forces the molten thermoplastic resin from the outlet 44 against the smooth surface of the roll 30 where, as the resin passes between the surface of roll 30 and the downstream edge of the die 40 the resin is formed into film 12.

The roll 30 is internally cooled so as to cool the film 12 to have sufficient strength to be stripped from the roll in laminate form around roll 50 by co-acting take-off rolls 52.

Rolls 22 and 30 are driven rolls with roll 22 operating at a surface speed of 2 to 10 percent less than the surface speed of roll 30. When roll 22 is operated at a faster relative speed, the flanged ribbed structure tends to build up in a loop between rolls 30 and 22. When roll 22 is operated at a slower relative speed, the molten flanges formed on the top of the ribs become rearwardly displaced relative to the ribs and in the case of transverse ribs, tend to be wiped to the rearward side of the ribs.

Rolls 24, 28 and 50 are idler rolls and are separated from their respective driven rolls by at least the thickness of the material passing therebetween. Roll 24 serves to bring the ribbed structure 15 into contact with hot roll 22 at the same location, regardless of the amount of ribbed structure on reel 20, so as to define a constant length of heating zone between roll 24 and transfer roll 28.

Advancement of the ribbed structure 15 through the heating zone (around the circumference of the hot roll) is obtained by the pull exerted on the flanged ribbed structure at and beyond the nip between rolls 28 and 30 by the bonding of the molten flanges 10 to film 12 and subsequent cooling of the ribbed structure laminate to solidify the bond. The tops of the ribs 6 and 8 are maintained in contact with hot roll 22 by retarding the rotation of the reel 20 by means such as flexible brakeband 40 draped over the ribbed structure on the reel. The brake band is pivotably mounted at one end to a fixed support 42 and at the opposite end to a weight 44. In addition to maintaining the ribs 6 and 8 in contact with the hot roll, the brake band also maintains the ribbed structure under tension while between reel 20 and roll 30, the degree of tension depending on the weight of weight 44. This tension acts to press the ribbed structure against the release surface on the hot roll to thereby form the flanges 10 on the top of ribs 6 and 8. The brake band extends across the entire transverse surface of the ribbed structure on reel 20 so as to uniformly tension the ribbed structure and thereby uniformly press the ribbed structure against the hot roll. This uniform pressure coupled with the uniform temperature of the roll leads to the formation of uniform flanges along the tops of ribs 6 and 8.

As for temperature conditions, the flanges 10 at the tops of the ribs 6 and 8 are molten as they are fed into the nip between transfer roll 28 and forming roll 30. By molten is meant that the resin in the flanges is at a temperature at or above its crystalline melting point. Stated more generally and to include resins that do not have a crystalline melting point, i.e. amorphous resins, molten can be described as any temperature of a heated metal surface on which a fresh sample of the resin leaves a trail of resin as the resin is moved essentially under gravitational pressure slowly across the surface. The molten nature of the flanges is provided by selecting the proper temperature of operation of the hot roll for the particular resin and residence time of the ribbed structure on the hot roll, i.e., rate of advancement and length of heating path used. Since the heating by the hot roll is primarily by conduction, the melting of the tops of the ribs is not accompanied by melting of the ribbed structure elsewhere or by shortening of the ribs caused by the elastic memory of the resin. The surface of the film 12 contacting the molten flanges should be at least a temperature at which the film sticks to the molten flanges under essentially light contact pressure. The surface of the film can be molten or can be at a temperature somewhat less than the temperature at which it is molten, in which case the molten flanges melt the surface of the film contacted thereby to get the heat bond desired.

The resultant laminate (laminate 2) has a smooth transition (radius 13) between the ribs and the film (film 12). Although some penetration of the molten flanges into the film may occur, this is not detrimental in view of the large area (width) of the heat bond between the film and the flanges relative to the thickness of the ribs and the absence of thinning out of the film and any sharp angle at the junction between the film and the ribs. Moreover, penetration is minimized as well as is the remaining geometry of the junction improved by the pre-shaping of the tops of ribs 6 and 8 into molten flanges prior to lamination. The caliper (thickness) of the laminate is much more precise than heretofore obtainable, falling within ± 2 mils of the caliper desired.

In addition to the improved geometry of junction between film and ribs in the present invention, the heat bond itself is of improved quality. The relatively low temperature of the hot roll and of the process for forming the film 12 and the absence of degradative atmospheres for each lead to this improvement.

In the resultant laminate, the strength of the junction between the film (film 12) and ribs is at least as good as the strength of the film and ribbed structure taken separately. Thus, failure of the laminate under tear, internal pressure, or peel generally occurs along a random path and at higher levels of stress than obtained by the prior art laminating processes where failures propagate generally along film-to-rib junctions.

The appearance of the laminate of the present invention is also improved. Upon cooling, concavities in the film 12 (or film 14) do not form, apparently because the air present within the laminate was not heated to as high a temperature as obtained using radiation and convection heating heretofore and therefore created much less of a vacuum upon cooling. Air entrapment between the film 12 and roll 30 is avoided by the pressure application of the resin forming the film against the roll and this leads to an imperfection-free surface of the film laminated to the ribbed structure.

With respect to the ribbed structure component of the laminate of this invention, this can be made by the process and apparatus disclosed in said Ser. No. 619,995, now U.S. Pat. No. 3,509,005. Instead of the network of ribs 6 and 8 integrally molded to the film 4 in the ribbed structure hereinbefore described, ribs in other intersection or non-intersecting, straight or curvilinear patterns can be used to form laminates of this invention, these being formed by forming a complementary pattern in the patterned roll of the apparatus of said Ser. No. 619,995, now U.S. Pat. No. 3,509,005. For example, ribs 8 can be omitted, whereby the ribs remaining, namely 6, define a plurality of parallel channels. When laminated to a film according to the present invention, the resultant laminate is useful in such applications as heat exchangers with resistance to delamination under internal pressure. In such application, the thickness of the films, i.e., 4 and 12, is preferably from 1 to 5 mils. The radii 13 between the ribs and the film 4 to which they are integrally molded (molded from a single mass of molten resin rather than molded into separate shapes followed by heat-bonding together) are obtained by rounding-off corners of the pattern in the patterned roll.

Further with respect to the ribbed structure component before flanging, the bulk density of the film and the pattern of ribs integrally molded therewith is generally less than 30 percent of the density of the resin forming the ribbed structure. Typically, however, the bulk density of the ribs and the ribbed structure will be less than 12 and 20 percent, respectively, of the density of the resin. In addition, the ribs will usually be at least as thick as the thickness of the film integrally molded therewith. The ribs prior to flanging generally have a height:width (thickness) ratio of at least 2:1 and preferably at least 5:1 and a spacing from one rib to the next of from about 20 to 50 times the thickness of film 4. These dimensions and relationships and the film and rib thicknesses hereinbefore given constitute the predominant geometrical characteristics of the ribbed structure used to make laminates of the present invention. However, minor proportions, i.e., less than 20 percent of the surface area of the ribbed structure measured in the principal plane of the structure can have different geometry, such as for example, an occasional thick rib with a height-to-width ratio of 1:1 for stiffening the resultant laminate or for giving it additional strength in the thickness direction.

Upon flanging, the height of the ribs is within 60 percent of the original height and usually within 80 percent of their original height. The width of the flange (flange 10) measured parallel to a film is usually at least twice the original thickness of the rib and more often at least three times the thickness thereof.

The process hereinbefore described can be used to form laminates of ribbed structure and film of much "heavier" construction than hereinbefore described, such as the constructions shown in U.S. Pat. No. 3,141,913.

By way of example, the ribbed structure 15 of high density polyethylene from reel 20 comprised a film about 3 mils thick integrally molded with intersecting ribs 6 and 8, each about 5 mils wide and 35 mils high with the ribs being about 100 mils apart in their respective directions. The hot roll 22 was covered with a 5 mil coating of polytetrafluoroethylene to form a release surface and was operated at a surface speed of 37.75 feet per minute, and at a temperature of 185° C. The forming roll 30 was maintained at a temperature of 112° C. and had a surface speed of 38.75 feet per minute, and the spacing between the die 40 and the surface of roll 30 was such as to give a high density polyethylene film thickness of 3 mils. The extrusion pressure in the die 40 was about 1,150 psi. and its temperature was 275° C. The flanges just prior to lamination were molten and were about four times wider than the thickness of the ribs, and total height of the rib (including flange) was about 30 mils. The resultant ribbed structure 2 had an overall thickness of 34 – 36 mils and smooth, imperfection-free film surfaces and the transition between ribs and film laminated thereto was smooth and free of sharp angles. The film 12 could not be peeled from the flanges and tearing of the laminate followed a random pattern.

Figure 11:
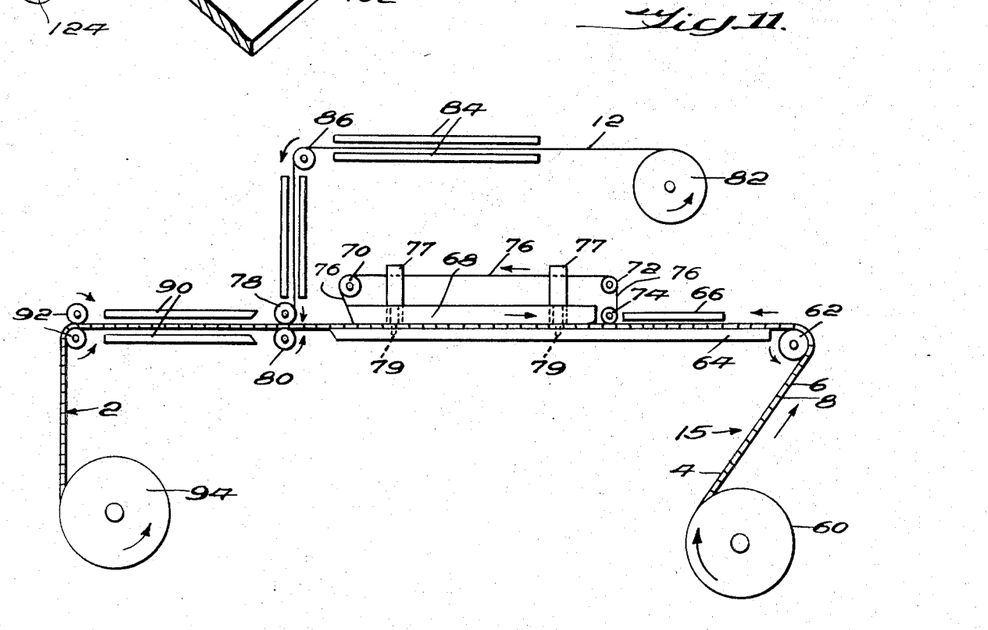
FIG. 11 shows in schematic side elevation another embodiment of apparatus for making improved ribbed structure of the present invention.

Other apparatus for making laminate of the present invention is shown in FIG. 11 wherein ribbed structure comprising film 4 and ribs 6 and 8 is fed from a reel 60 rotating in the direction indicated and rotating roll 62 which directs the ribbed structure film side down along a tabletop-like hot plate 64. Immediately succeeding the forward edge of the hot plate 64 is a preheat zone defined by a second hot plate 66 operating to preheat the top of the ribbed structure passing between it and the hot plate 64 prior to reaching the melting zone. Following this preheating, the ribbed structure advances beneath an electric heater 68 in the form of a flat plate extending a considerable length along the path of the ribbed structure and entirely across the width of the ribbed structure. Trained around the bottom surface of the heater 68 and idler rolls 70, 72 and 74 is a moving conveyor-type belt 76 made of a release material to which molten thermoplastic resin has no appreciable adherence. The melt 76 of release material is disposed between the entire underside of the heater 68 and the tops of the ribs 6 and 8 of the ribbed structure.

As the ribbed structure enters beneath the heater 68 there is provided some clearance between belt 76 and surfaces 64. However, as the ribbed structure proceeds along beneath the heater 68, the spacing between it and the surface 64 diminishes until the belt 76 which is heated by heater 68 contacts the tops of the ribs 6 and 8 of the ribbed structure to cause their melting to form the flanges 10 shown in FIGS. 1 and 4. The belt 76 travels with the ribbed structure by virtue of the slight friction of the molten flanges dragging the belt along at the same speed as the ribbed structure. The belt and ribbed structure are prevented from sideways movement by guide rails (not shown) and the spacing between hot plate 64 and heater 68 is fixed by spaced micrometer stops 77 in threaded engagement with heater 68 and having rods 79 extending therefrom into and bottomed against corresponding depressions in hot plate 64 astride each edge of the ribbed structure.

The heated ribbed structure in which the ribs are now molten and flanged at their tops to a degree corresponding to the spacing between hot plate 64 and the heater 68 at the exit of the heating zone comes into contact with heated film 12 of thermoplastic resin at the nip between laminating rolls 78 and 80. The film 12 is provided from a reel 82 from which the film passes through the heating zone between a first pair of heaters 84, around a change-of-direction roll 86 and through the heating zone of a second pair of heaters 88, which uniformly heat the film to a temperature to cause it to stick to the molten flanges under essentially light contact pressure. By way of example, the heater 68 can be at 275° C. and hot plates 64 and 66 and heaters 84 and 88 can all be at 120° C. for processing high density polyethylene.

Following lamination at the nip between rolls 78 and 80, the resultant laminate 2 passes through a zone bounded by a pair of cooling elements 90, through the nip between a pair of take-up rollers 92 and onto a wind-up reel 94. The rollers 92 serve to advance both the film and the ribbed structure through the entire apparatus, and the rotation of both the reel 60 and reel 82 are retarded so as to maintain both the ribbed structure 15 and the film 12 under slight tension in passing through the apparatus.

In another embodiment, the preheating and melting apparatus arrangement of FIG. 11 (hot plates 64 and 66, heater 68 and belt 76) is used to supply flanged ribbed structure to the nip between rolls 28 and 30 of the apparatus of FIG. 6 to form laminate 2. Using the same specific high density polyethylene ribbed structure and film 12 described hereinbefore, a roll 30 surface speed of 15 feet per minute and a heater 68 temperature of 275° C., the high quality laminate 2 was produced.

In the embodiments of both FIGS. 6 and 11, the principle of heat-bonding is to contact the edge(s) to be heat-bonded, i.e., the tops of the ribs 6 and 8, with a heated release surface moving with the edge, followed by progressively removing the molten edge from the release surface and progressively contacting this molten portion with a surface of thermoplastic resin, such as the film 12, in sufficiently heated condition to cause bonding at the location of the contact between the two objects. This principle of heat-bonding thermoplastic resin objects is useful in other bonding applications, such as are shown in FIGS. 12 through 15.

Figure 12:
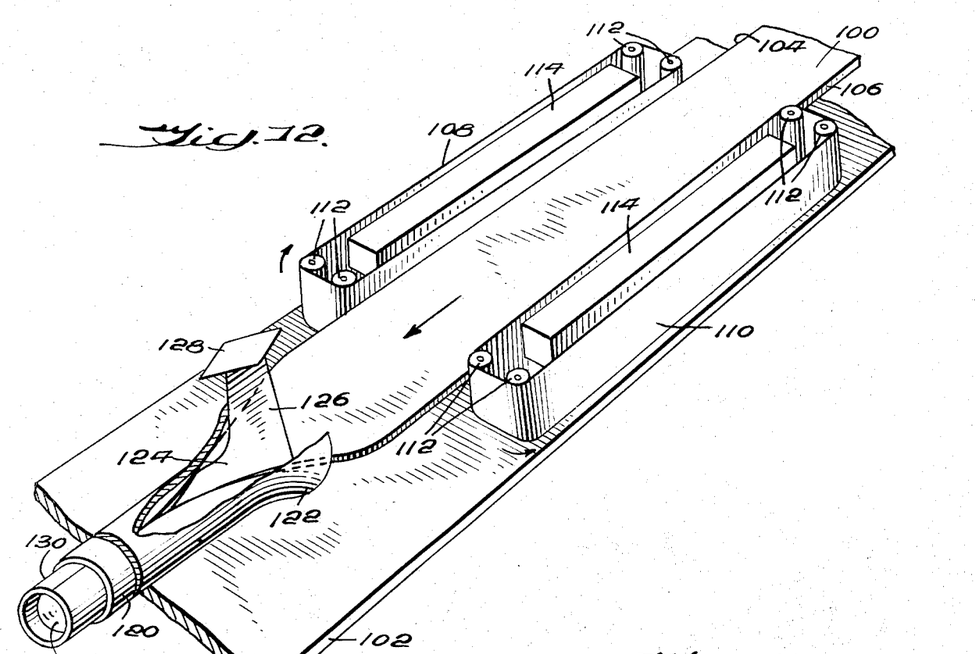
FIG. 12 shows in schematic perspective view an embodiment of apparatus for heat-bonding thermoplastic resin edge-to-edge.

In greater detail, illustrating edge-to-edge heat-bonding, in FIG. 12 a sheet 100 of thermoplastic resin which can be in the form of ribbed structure 15, laminate 2, or some other form, or even solid thermoplastic resin, advances by conventional means (not shown) along the surface (the sheet is spaced from the surface) of a tabletop-like structure 102 in the direction indicated. The edges 104 and 106 of this sheet 100 first each move in contact with conveyor-like type belts 108 and 110 each moving in the direction indicated around idler guide rollers 112 and across the surface of heaters 114. The heaters 114 heat the belts 108 and 110, in the same way as heater 68 heats belt 76 in FIG. 11, to form a molten bead of thermoplastic resin along the edges 104 and 106 of the sheet 100 as the sheet emerges from between the belts 108 and 110. The belts move with the edges 104 and 106 by slight frictional engagement of the edges for the belt, especially when the edges include the edges or ribs such as provided by ribbed structure or by laminate of this invention.

Before these molten beads can solidify, the sheet 100 passes into a cylindrical forming tube 120 having an outwardly flared section 122 on its inlet side. Also entering the tube 120 through section 122 is a mandrel 124 extending from a support arm 126. The support arm is in turn secured to a bracket 128 for mounting to an external stationary support (not shown), thereby positioning the mandrel within the forming tube. The mandrel 124 is concentrically spaced from the inner wall of the forming tube 120 in such a way that the sheeting 100 enters the forming tube through the outwardly flared section 122, curls around the mandrel 124 so that the edges 104 and 106 come together in register while still molten to thus heat-bond to one another. The resultant tube 130 of thermoplastic resin emerges from the forming tube 120 further downstream after the heat-bonded seam has cooled sufficiently to remain intact. The tubing 130 can be used in such applications as the ducting of fluids or can be cut into short sections which form the sidewalls of cylindrical containers. The sheet 100 can be formed in the same way into tubing of a different cross section such as elliptical, square, or rectangular cross sections by use of correspondingly shaped forming tube and mandrel and appropriate scoring of the sheet, if necessary.

Figure 13:
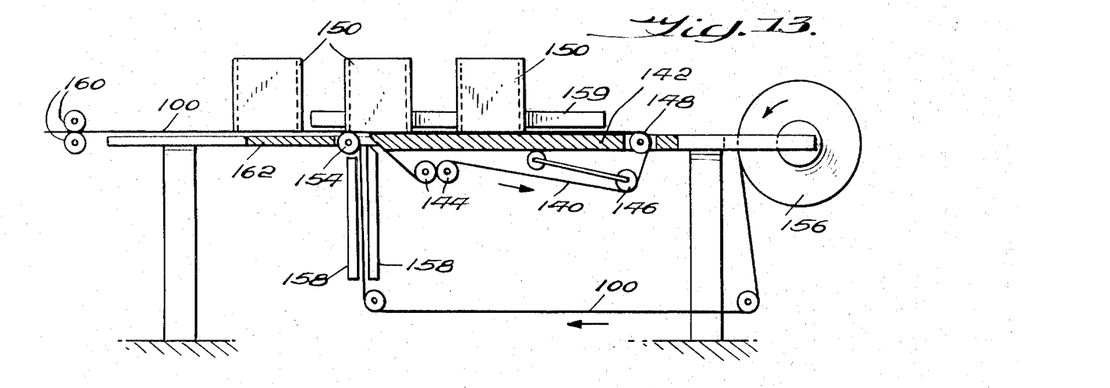
FIG. 13 shows in schematic side elevation and partial cross section an embodiment of apparatus for heat-bonding thermoplastic resin edge-to-surface.
Figure 14:
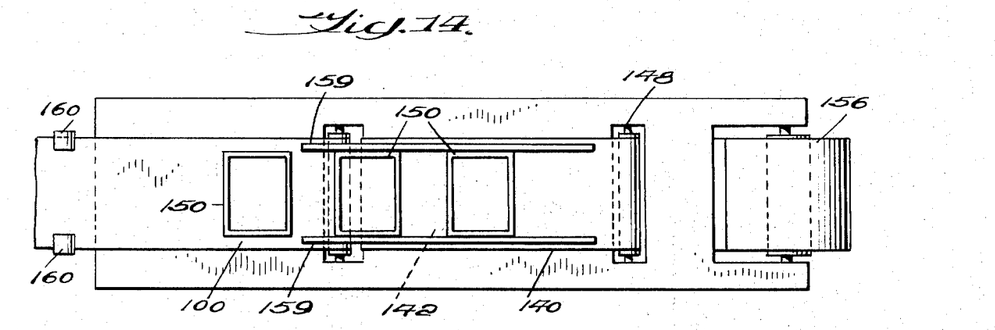
FIG. 14 shows a plan view of the apparatus of FIG. 13.
Figure 15:
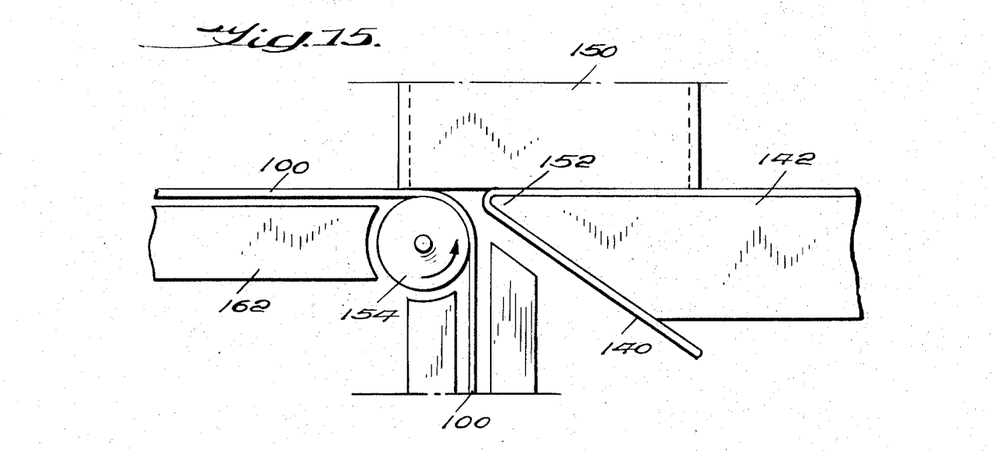
FIG. 15 shows in enlargement a view of the heat-bonding portion of the apparatus of FIG. 13.

In FIGS. 13 through 15, there is shown an apparatus for heat-bonding sheeting of thermoplastic resin to the bottom edge of tubular shapes formed of thermoplastic resin. In greater detail, in FIG. 13 a conveyor belt 140 of release material is provided trained around an electrical heater 142, a pair of driving rolls 144, a spring-loaded roll 146, and an idler roll 148; the belt 140 moving in the direction indicated by the arrow. Tubes 150 are placed on the belt 140 adjacent to roll 148, and the belt 140 conveys the tube over the surface of the heater 142 to the opposite end thereof. During this conveying, the heat of the heater 142 is transmitted through the belt 140 to the contacting edges of the tubes 150 to cause them to melt by the time they reach the opposite end of the heater 142. The weight of the tubes 150 maintaining contact between their bottom edge and belt 140 and later on sheeting 100 can be augmented by applying a small pressure against the top of the tubes 150 by means such as a pressure plate bearing on a conveyor belt (not shown) moving with and in contact with the tops of the tubes.

The belt 140 breaks free of the molten edges (beads) of the tube 150 at the opposite end of the heater 142 by being diverted sharply away from the path of the container 150 as shown in FIG. 15. It has been found that the angle of diversion of the belt 140 from the path of the container 150 is preferably at least about 120° and the radius at the nose 152 of the heater 142 preferably no greater than about ¼ inch in order to break away from the discrete objects (tubes 140) being treated. Diversion of lesser sharpness can be used when the object, e.g., ribbed structure 15, is continuous.

Immediately succeeding the nose of heater 142 is provided heated sheeting 100 of thermoplastic resin trained about roll 154 rotating in the direction indicated, so as to form a continuation of the path of travel of containers 150. The progressive contact of the sheeting 100 with the molten edges at the bottom of containers 150 in vicinity of roll 154, causes the sheeting 100 to be heat-bonded to the bottom of the tubes, thus forming ends thereof. A pair of guide rails 159 are positioned to prevent sideways movement of the tubes during heating and bonding.

As best shown in FIG. 13, the sheeting 100 is supplied from a reel 156 from which the sheeting passes through the heating zone of a pair of heaters 158 immediately preceding roll 154 to heat the sheeting sufficiently to heat bond to the molten edges of containers 150. Two pairs of take-up rolls 160 draw the edges of sheeting 100 and thereby the tubes 150 laminated thereto across the surface of a cold plate 162. The pairs of rolls 160 are spaced far enough apart so that the tube 150 can pass therebetween. The sheeting 100 can later be severed so as to separate the tubes 150 one from the other, with portions of the sheeting 100 remaining thereon as ends on the tubes. The rolls 160 and the driving rolls 144 are driven synchronously so that belt 140 and sheet 100 move at the same surface speed. The thermoplastic resin making up the tubes 150 and the sheeting 100 can be ribbed structures or laminates of the present invention and the like, or can be solid thermoplastic resin.

The materials that can be used as a release material in the present invention are those high polymers which have low friction character, low adherence, high inertness and high temperature stability, and high toughness and mechanical strength. Typically, the resin will be a fluorocarbon resin such as tetrafluoroethylene polymer, including the homopolymers and copolymers thereof with one or more other monomers which may render the polytetrafluoroethylene melt-fabricable, i.e., fabricable from a melt, and does not detract significantly from the properties of the homopolymers. Typical of such copolymers is the copolymer of tetrafluoroethylene/hexafluoropropylene and tetrafluoroethylene/perfluoroalkyl vinyl ether, such as perfluoropropyl vinyl ether. Materials other than fluorocarbon resins, such as polyimides and silicone polymers can be used as release materials, with the choice of release materials depending on which thermoplastic resin is to be melted thereagainst. Generally, the release material may be used by itself or as coating and/or impregnant in a fabric, such composites being available under the trademark "Armalon" which is further described in Booklet A-48488 of E. I. du Pont de Nemours and Company. The release material in either form can be used as coating 26 shown in FIG. 9, and is used preferably in the composite form when used as a conveyor belt such as belts 76, 108, 110 and 140 to provide greater strength to the belt. Generally, such belts are 5 – 8 mils thick.

The thermoplastic resins from which laminates of the present invention can be made and from which sheeting 100 and film 12 can also be made are any of those high molecular weight polymers which are extrudable into continuous solid shapes from a heated, molten condition and under relatively high pressures. The polymers should also have coherence (melt strength) between the molten flanges and their respective ribs, which is greater than adherence of the molten flanges to the release surface. Examples of such polymers include the saturated hydrocarbon polymers (polyolefins) such as linear or branched polyethylene, polypropylene and copolymers thereof; ionomers such as described in U.S. Pat. No. 3,264,272 to Rees; copolymers of ethylene with an $\alpha,\beta$-unsaturated carboxylic acid such as described in British Pat. No. 963,380 and blends thereof with saturated hydrocarbon polymers; halogenated or perhalogenated olefins such as vinyl chloride polymer and melt-fabricable tetrafluoroethylene polymers and chlorotrifluoroethylene polymer; polyvinyl acetate and copolymers thereof with saturated hydrocarbon polymers and, optionally, the acid copolymers of British Pat. No. 963,380; the polyamides such as polyhexamethylene adipamide (66 nylon) polyhexamethylene sebacamide (610 nylon), polycaprolactam (6 nylon), copolymers thereof and blends of the polyamides with acid copolymers, ionomers and/or saturated hydrocarbon polymers, oxymethylene polymers including homopolymers and copolymers; polycarbonate; polystyrene; ABS resin; and polyethylene terephthalate. The film 12 and ribbed structure such as ribbed structure 15 can be of different thermoplastic resins but will usually be the same.

As many apparently widely different embodiments of this invention may be made without departing from the spirit and scope thereof, it is to be understood that this invention is not limited to the specific embodiments thereof except as defined in the appended claims.

I claim:

1. A process for heat bonding an edge of a first thermoplastic resin object to an edge or surface of a second thermoplastic resin object, comprising advancing said first object along a path with its edge in contact with a heated release surface moving therewith to melt its edge, said first object being under compression against said release surface whereby said molten edge forms into a flange thereagainst, progressively removing the said first object and thereby the molten edge in the form of a flange from said release surface, and progressively contacting said flanged molten edge with said edge or surface of said second object in sufficiently heated condition to cause heat-bonding at the location of said contact, to form a junction between the edge of the first object and the edge of the second object having a radius on each side of the junction equal to at least the thickness of the edge of the first object.

2. The process of claim 1 wherein said first object is a ribbed structure comprising a film and a plurality of ribs integrally molded therewith extending from a surface of said film and the tops of said ribs form the edge melting in contact with said release surface.

3. The process of claim 2 wherein said path and release surface is curved and the compression of said ribbed structure is obtained by maintaining said ribbed structure under tension while advanced along said path.

4. The process of claim 2 wherein said second object is in the form of a film and it is a surface thereof that contacts the molten tops of said ribs.

5. The process of claim 1 wherein said first and second objects are one, in the form of a sheet, and the opposing edges of said sheet in the direction of advancement thereof are each in contact with a heated release surface, and the contacting step consists of bringing the resultant molten edges of said sheet together to form a tubular shape therefrom.

* * * * *